US006868363B2

(12) United States Patent
Baran et al.

(10) Patent No.: US 6,868,363 B2
(45) Date of Patent: Mar. 15, 2005

(54) METHODS AND SYSTEMS FOR CALCULATING STEAM TURBINE RADIAL CLEARANCE

(75) Inventors: Robert Gerard Baran, Clifton Park, NY (US); Gene David Palmer, Clifton Park, NY (US); John Cleland Lavash, Niskayuna, NY (US); Norman Douglas Lathrop, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 10/341,779

(22) Filed: Jan. 14, 2003

(65) Prior Publication Data

US 2004/0138851 A1 Jul. 15, 2004

(51) Int. Cl.[7] ................................................. G01B 5/28
(52) U.S. Cl. ........................... 702/158; 702/38; 702/57; 324/260
(58) Field of Search .............................. 702/158, 33, 38, 702/64, 57, 182–183, 189; 324/772, 260, 545–546; 340/635, 537

(56) References Cited

U.S. PATENT DOCUMENTS

| | | |
|---|---|---|
| 4,795,307 A | 1/1989 | Liebl |
| 5,395,124 A | 3/1995 | Brandon |
| 5,455,778 A * | 10/1995 | Ide et al. ........................ 703/1 |
| 5,459,674 A | 10/1995 | Ide et al. |
| 5,547,340 A | 8/1996 | Dalton et al. |
| 5,651,707 A | 7/1997 | Lemont |
| 5,775,873 A | 7/1998 | Dalton et al. |
| 5,810,365 A | 9/1998 | Brandon et al. |
| 5,934,684 A | 8/1999 | Brandon et al. |
| 6,434,491 B1 * | 8/2002 | Miyata et al. ................. 702/38 |

OTHER PUBLICATIONS

Calculation of the electromagnetic parameters of a switched refluctance motor using an improved FEM–BIEM. Application to different models for the torque calculation, Omekanda et al., 1996 IEEE.*

* cited by examiner

*Primary Examiner*—John Barlow
*Assistant Examiner*—Hien Vo
(74) *Attorney, Agent, or Firm*—Armstrong Teasdale LLP (57) ABSTRACT

A method and a system for determining radial clearances in a rotating machine are provided. The rotating machine includes at least one shell, at least one rotor, and at least one stationary component. The method includes creating a finite element model for at least one component within the rotating machine, creating a cycle deck data file for the rotating machine, determining an initial clearance versus time, and determining an initial clearance versus location. The system includes a client system including a browser, a centralized database for storing machine information, and a server system configured to be coupled to the client system and the database wherein the server system is further configured to receive machine information from the client system, store finite element model information in the centralized database, track machine information, update the centralized database periodically with newly received machine information to maintain machine information, and provide machine information in response to an inquiry.

18 Claims, 12 Drawing Sheets

METHODS AND SYSTEMS FOR CALCULATING STEAM TURBINE RADIAL CLEARANCE

BACKGROUND OF THE INVENTION

This invention relates generally to rotating machinery, and more particularly to steam turbines, and methods and system for calculating steam path clearances in steam turbines.

A steam turbine includes a steam path which typically includes, in serial-flow relationship, a steam inlet, a turbine, and a steam outlet. At least some known turbine rotor assemblies include a plurality of rows of blades coupled to a rotor wheel. The blades are arranged in axially-spaced stages that extend circumferentially around the rotor wheel. More specifically, each stage includes a set of stationary blades or nozzles, and a set of cooperating rotating blades, known as buckets. The tips of the rotating blades are surrounded by a turbine casing such that a radial gap is defined between the rotor blade tips and the casing.

An operating efficiency of the turbine is at least partially dependent upon the radial clearance or gap between rotor blade tips and the casing. For example, if the clearance between the rotor blade tips and the surrounding casing is too large, flow may leak through the gap between the rotor blade tips and the surrounding casing, decreasing the turbine's efficiency. However, if the clearance is too small, the rotor blade tips may strike the surrounding casing during certain turbine operating conditions. To facilitate optimizing the turbine efficiency, the clearance is adjusted to enhance steady-state performance while maintaining an adequate clearance margin as the turbine accelerates and decelerates through the rotor train vibration criticals. A cold clearance, which is initially tight, can result in excessive regenerative rubs. Over time, continued rubs may cause loss of material and/or a blunt or mushroomed seal tooth which may change the flow characteristics and adversely affect the performance of the turbine. A balanced design may provide tight average operating clearances as well as facilitate avoiding rubs during transients and operating at off-design conditions.

Turbine radial clearances may change during periods of acceleration or deceleration due to changing centrifugal force induced to the blade tips, and/or due to relative thermal growth between the rotating rotor and stationary casing. During periods of differential centrifugal and thermal growth, clearance changes may result in rubbing of the moving blade tips against the stationary casing. Such an increase in blade tip clearance results in efficiency loss. Since components of steam turbines are made of different materials with different thicknesses, such components exhibit different rates of thermal growth from a cold startup condition to steady state operating condition and during transient operating conditions. Additionally, turbine components are subject to vibratory excitement during transient operation that also affects steam path clearances. Such differences make calculating steam path clearances difficult and time consuming.

BRIEF DESCRIPTION OF THE INVENTION

In one aspect, a method of determining radial clearances in a rotating machine is provided. The rotating machine includes at least one shell, at least one rotor, and at least one stationary component. The method includes creating a finite element model for at least one component within the rotating machine, creating a cycle deck data file for the rotating machine, determining an initial clearance versus time, and determining an initial clearance versus location.

In another aspect, a computer program embodied on a computer readable medium for determining a rotating machine radial clearance is provided. The program includes a code segment that prompts a user to input at least one of a machine identifier, a user identifier, a current date and time, and a comment retrieves stored data for the machine identified, prompts a user to input data from a selection of data exclusive to the machine identified, provides a user with an input file status for the machine identified, and provides a graphical output of calculations based on data input by the user and data retrieved from storage.

In yet another aspect, a system for determining radial clearances in a rotating machine is provided. The rotating machine includes at least one shell, at least one rotor, and at least one stationary component. The system includes a client system including a browser, a centralized database for storing machine information, and a server system configured to be coupled to the client system and the database wherein the server system is further configured to: receive machine information from the client system, store finite element model information in the centralized database, track machine information, update the centralized database periodically with newly received machine information to maintain machine information, and provide machine information in response to an inquiry.

BRIEF DESCRIPTION OF THE DRAWINGS

FIG. 12 is a screen shot of an exemplary display that may output from clearance synthesis dashboard shown in. FIG. 3.

DETAILED DESCRIPTION OF THE INVENTION

Figure 1:
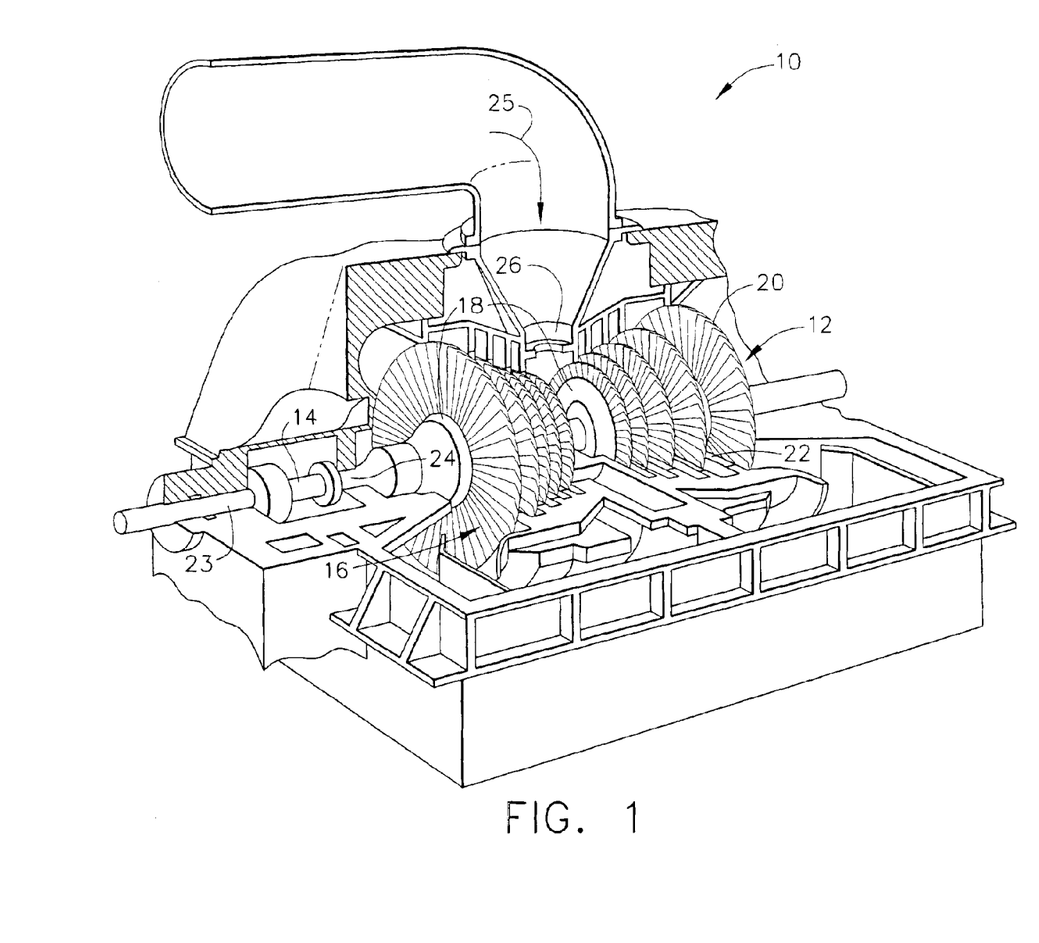
FIG. 1 is a perspective partial cut away view of an exemplary steam turbine.

FIG. 1 is a perspective partial cut away view of an exemplary steam turbine 10 including a rotor 12 that includes a shaft 14 and a plurality of turbine stages 16. Turbine rotor 12 includes a plurality of axially spaced rotor wheels 18. A plurality of buckets 20 are mechanically coupled to each rotor wheel 18. More specifically, buckets 20 are arranged in rows that extend circumferentially around each rotor wheel 18. A plurality of stationary nozzles 22 extend circumferentially around shaft 14 and are axially positioned between adjacent rows of buckets 20. Nozzles 22 cooperate with buckets 20 to form each turbine stage 16 and to define a portion of a steam flow path through turbine 10. Shaft 14 is supported and guided in rotation by a plurality of bearings 23 and 24.

In operation, steam 25 enters an inlet 26 of turbine 10 and is channeled through nozzles 22. Nozzles 22 direct steam 25 downstream against buckets 20. Steam 25 passes through the remaining stages 16 imparting a force on buckets 20 which causes rotor 12 to rotate. At least one end of turbine 10 may extend axially away from rotor 12 and may be attached to a load or machinery (not shown), such as, but not limited to, a generator, and/or another turbine. Accordingly, a large steam turbine unit may actually include several turbines that are all co-axially coupled to the same shaft 14. Such a unit may, for example, include a high-pressure (HP) turbine coupled to an intermediate-pressure (IP) turbine, which is coupled to a low-pressure (LP) turbine. In one embodiment, steam turbine 10 is commercially available from General Electric Power Systems, Schenectady, N.Y.

Figure 2:
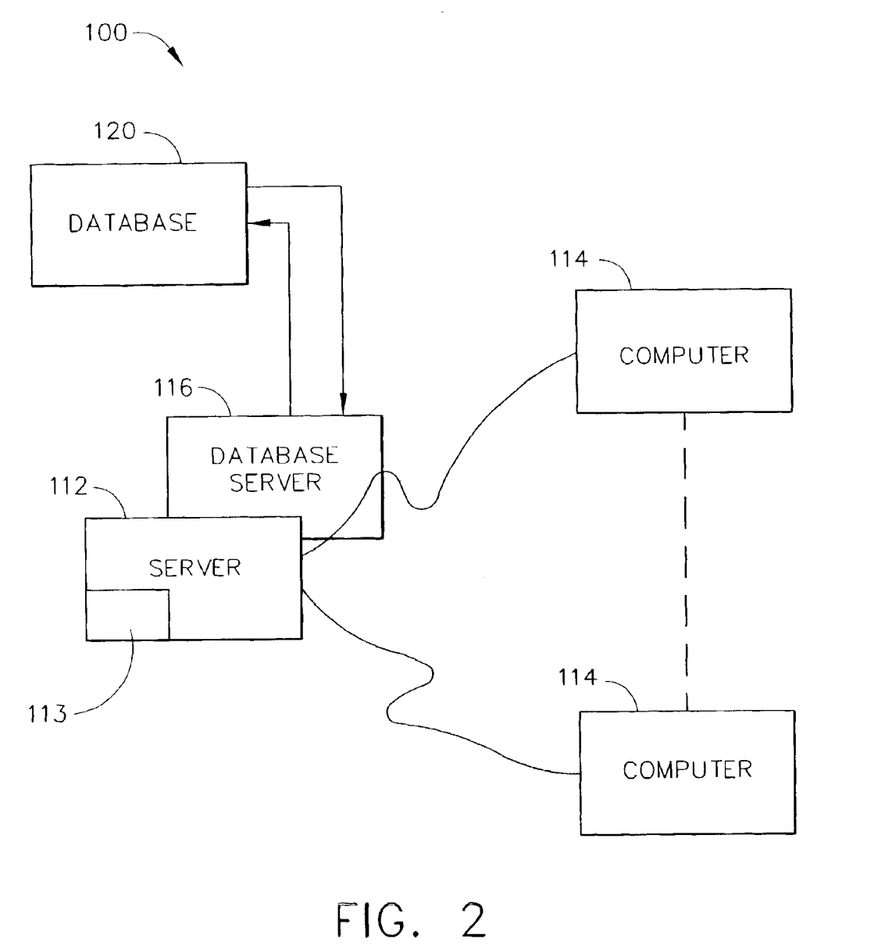
FIG. 2 is a simplified block diagram of a clearance synthesis dashboard computer system.

FIG. 2 is a simplified block diagram of a clearance synthesis dashboard computer system 100 including a server system 112 including a disk storage unit 113 for data storage, and a plurality of client sub-systems, also referred to as client systems 114, connected to server system 112. In one embodiment, client systems 114 are computers including a web browser, such that server system 112 is accessible to client systems 114 via the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment database 120 is stored remotely from server system 112 and may be non-centralized.

Figure 3:
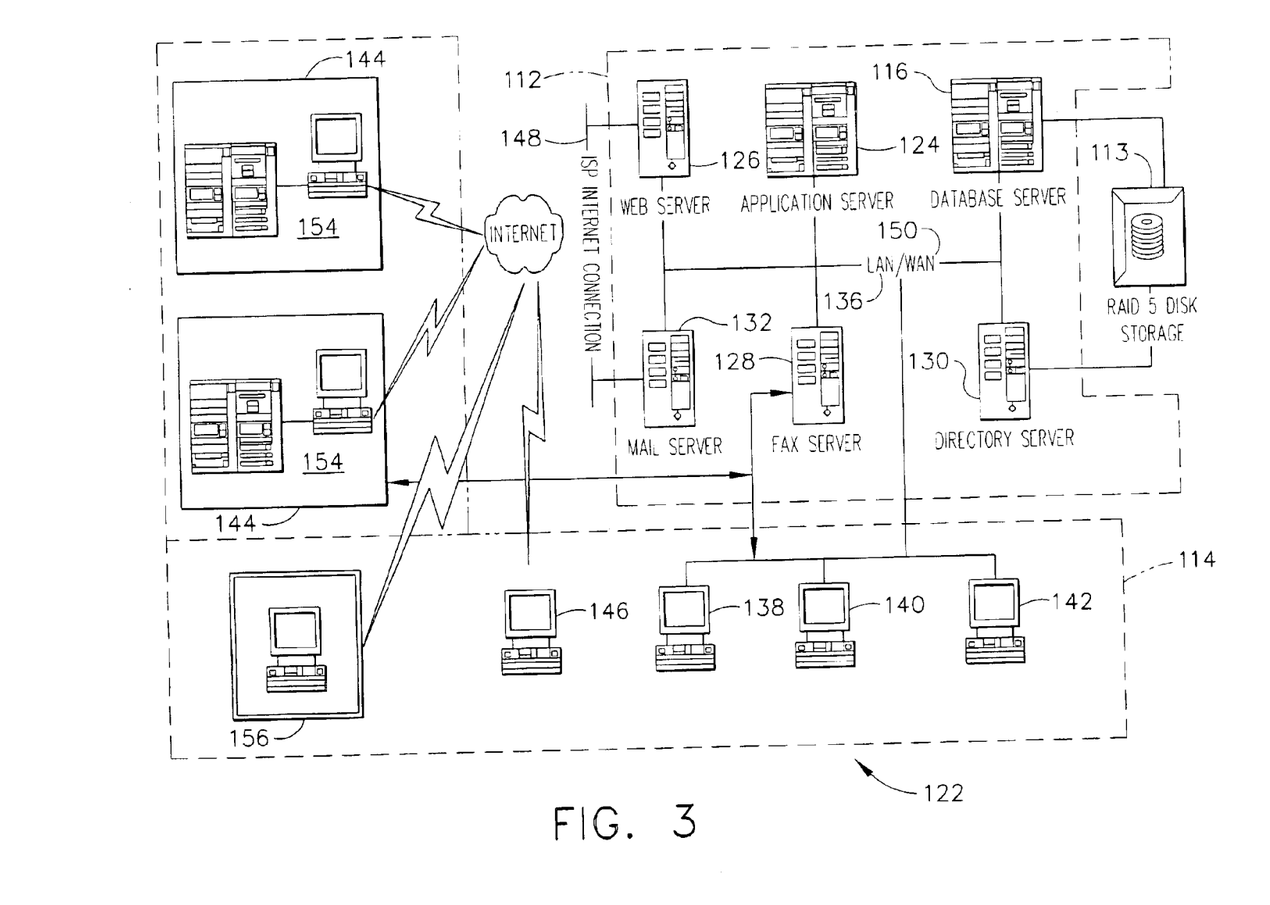
FIG. 3 is an expanded version block diagram of an example embodiment of a server architecture of the clearance synthesis dashboard computer system shown in FIG. 2.

FIG. 3 is an expanded version block diagram 122 of an example embodiment of a server architecture of clearance synthesis dashboard computer system 100 shown in FIG. 2. Components in diagram 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. Disk storage unit 113 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 via an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136. In an example embodiment, client system 114 includes workstation 140 which can be used by an internal analyst or a designated outside field engineer to review clearance information relating to an analyzed machine.

Server system 112 is configured to be communicatively coupled to various individuals, including employees 144 and to field engineers 146 via an ISP Internet connection 148. The communication in the example embodiment is illustrated as being performed via the Internet, however, any other wide area network 150 (WAN) type communication can be utilized in other embodiments, i.e., the systems and processes are not limited to being practiced via the Internet. In addition, and rather than WAN 150, local area network 136 could be used in place of WAN 150.

In the exemplary embodiment, any authorized individual having a workstation 154 can access clearance synthesis dashboard computer system 100. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 via a telephone link. Fax server 128 is configured to communicate with other client systems 138, 140, and 142 as well.

Figure 4:
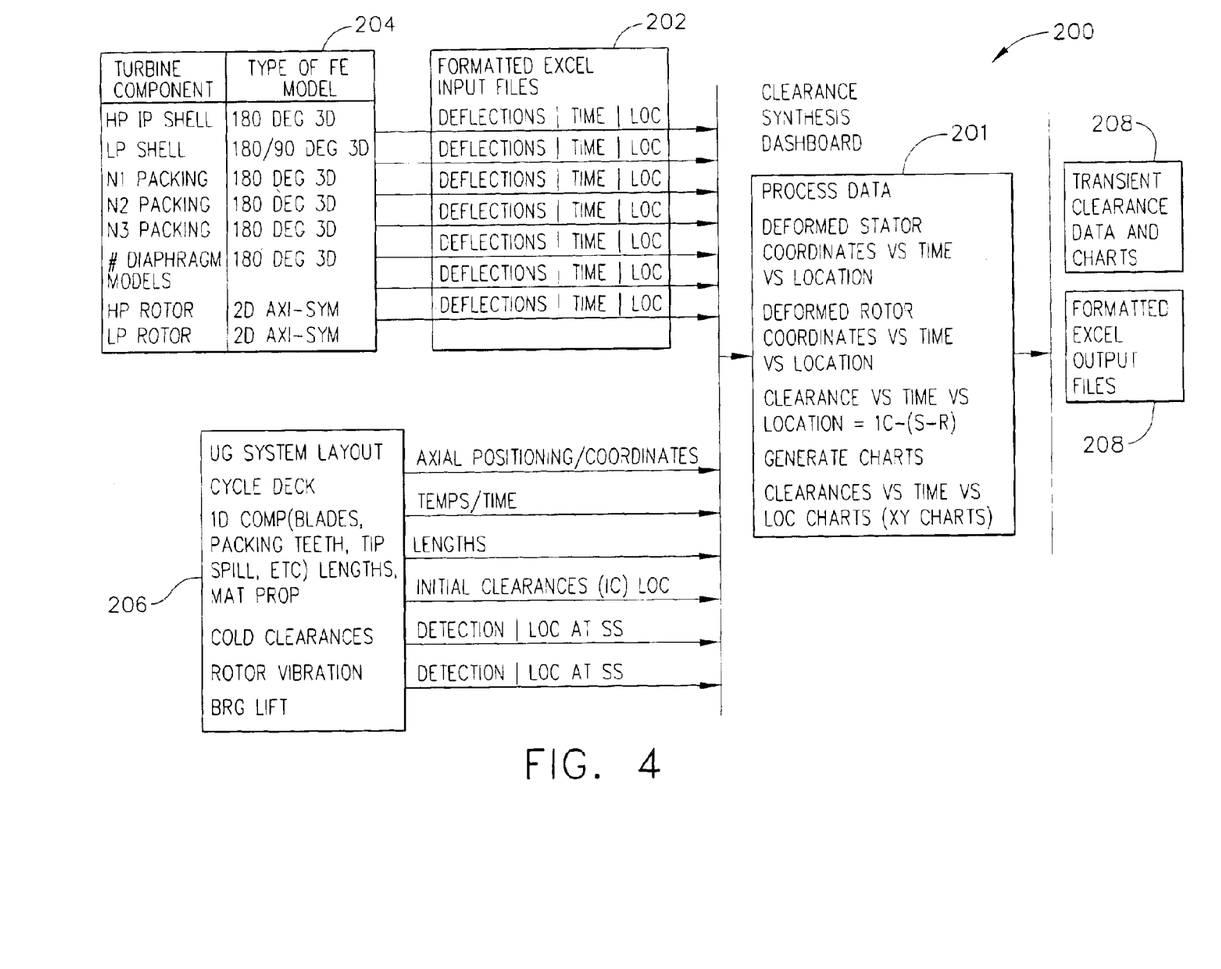
FIG. 4 is an exemplary data flow diagram of a clearance synthesis dashboard that may be used with the clearance synthesis dashboard computer system shown in FIG. 2.

FIG. 4 is an exemplary data flow diagram 200 of a clearance synthesis dashboard 201 that may be used with clearance synthesis dashboard computer system 100 shown in FIG. 2. Clearance synthesis dashboard 201 includes a plurality of input data files 202. In the exemplary embodiment, input data files 202 are formatted Excel™ input files. Input data files 202 are derived from finite element analysis models 204. Each component of interest, for example, but not limited to, an HP/IP turbine shell, an LP shell, an N1 packing, an N2 packing, an N3 packing, a plurality of diaphragms, an HP turbine rotor, and an LP turbine rotor in steam turbine 10 is modeled In one embodiment, finite element models of the components are created by a third party and files of the components are transmitted to clearance synthesis dashboard 201. A type of finite element model used for each component is variably selected depending on the affect of each component on radial clearances in steam turbine 10. In the exemplary embodiment, the finite element models used to describe the HP/IP turbine shell, the N1 packing, the N2 packing, the N3 packing, and diaphragms are 180°, three-dimensional models. The LP shell finite element model is a 180/90°, three dimensional model. The HP rotor and LP rotor finite element models are two-dimensional axi-symmetric models.

Input data files 202 include component deflections versus time, and component deflection versus location data.

Clearance synthesis dashboard 201 also includes a plurality of input data files 206 that relate to system parameters that may affect turbine clearances. For example, in the exemplary embodiment, input data files 206 include system layout data, cycle deck, one dimensional component lengths and material properties for components, such as, for example, blades, packing teeth, and tip spill, cold clearance data, rotor vibration data, and bearing lift data. System layout data may include, but is not limited to, axial positioning and coordinate definition for components in steam turbine 10. Cycle deck data may include temperature versus time data at various locations in steam turbine 10 for a plurality of turbine operations, including steady state, transient, trip, and abnormal operations. Some components of steam turbine 10 include a temperature influence in substantially only one dimension of interest when calculating radial clearances, for example, blades and/or buckets, packing teeth, and tip spill. For these components, a component length and material properties are used to determine the length of the component at a time or location of interest.

Cold clearance data includes initial clearances between components in a cold iron condition. A cold iron condition is a condition defined when steam turbine 10 has been idle for a sufficient period of time, such that steam turbine components achieve ambient temperature. Rotor vibration data for components of steam turbine 10 is used to calculate clearances during turbine operations wherein turbine vibration may occur, such as, but not limited to, steady state operations, passing through turbine critical speeds operations, abnormal load operations, overspeed operations, and carryover operations. Rotor vibration data may include a rotor resonance condition, a rotor vibration velocity amplitude versus rotor rotational speed, a rotor vibration displacement amplitude versus rotor rotational speed, and a rotor deflection versus location at a steady state operating condition of the machine. Bearing lift data includes data relating to deflections of rotor components as rotor 12 is re-positioned by changing oil film clearances at bearings 23 and 24. Bearing oil film clearances may change during changes in turbine load, turbine speed changes during run-up and trip, and when oil temperature changes.

Input data files 202 and 206 are available to clearance synthesis dashboard 201 through either resident files stored on the same computer, or workstation, or through a network.

In operation, clearance synthesis dashboard 201 prompts a user to enter data. Based on information in input data files 202 and 206, and data input into clearance synthesis dashboard 201, clearance synthesis dashboard 201 calculates a deformed rotor solution in coordinate form, and a deformed stator solution in coordinate form. These solutions are then combined with initial clearance data to determine radial steam path clearances versus time and radial steam path clearances versus location. Clearance synthesis dashboard 201 then outputs 208 the radial steam path clearances data in a predetermined format selected by the user. The user may select an output, for example, in tabular form, as time-based graphs, as location-based polar charts, and as a computer file.

In operation, clearance synthesis dashboard 201 reads specific data from input files 202 and 206, performs calculations, and displays results of the calculations in tables and graphs. In the exemplary embodiment, dashboard 201 calculates several results, such as, for example, rotor and stator totals, packing corrections, rotor dynamics. In another embodiment, dashboard 201 determines other turbine clearance statistics. In the exemplary embodiment, dashboard 201 is written in Visual Basic for Applications™ and is embedded in an Excel™ workbook named, "Clearance10&11.xls" and resides on network drive 113 on server 112. In another embodiment, dashboard 201 may located on a local drive or a remote drive accessible to users.

Figure 5:
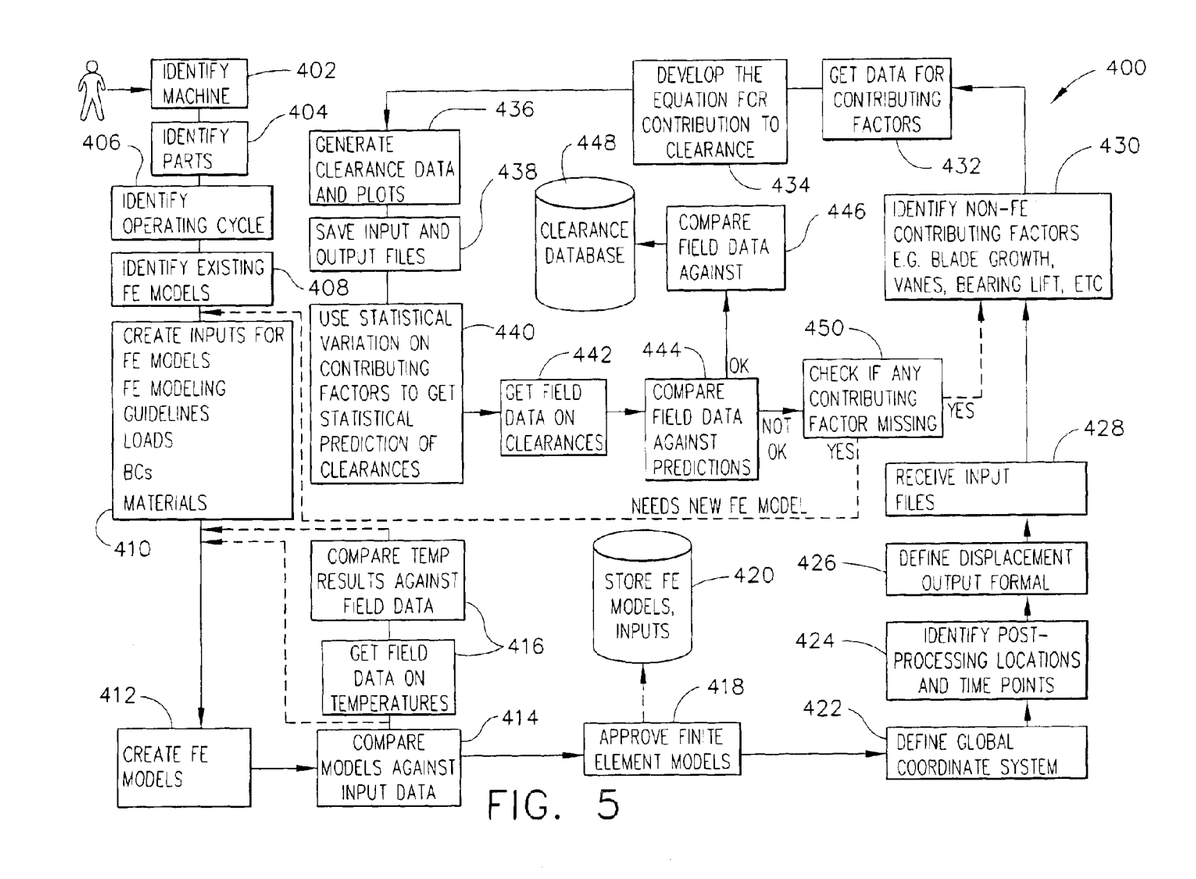
FIG. 5 is an exemplary process flow diagram that may be used to generate input data for the clearance synthesis dashboard shown in FIG. 3.

FIG. 5 is an exemplary process flow diagram 400 that may be used to generate input data for clearance synthesis dashboard 201. Initially, a machine which clearance data will be determined is identified 402. Parts or components that makeup the machine are then identified 404, and an operating lifecycle of the machine is identified 406. Existing finite element (FE) models for components is identified 408. If an FE model does not exist for a component, inputs for an FE model are created 410. In the exemplary embodiment, FE modeling inputs include, but are not limited to, FE modeling guidelines, loads and constraints, boundary conditions (BC), and material properties of the component. From the inputs created 410, FE models are created 412. The models are compared 414 to temperature data received 416 from the field, meaning operating installations or test installations. If the models and compare favorably to field data, the FE models are approved 418 and stored 420 on network drive 113 or other location accessible to users of clearance synthesis dashboard 201

A global coordinate system is then defined 422, desired post-processing locations and time points are identified 424, a displacement output format is also defined 426. Input files are received 428. In the exemplary embodiment, the input files are formatted Excel™ files. In another embodiment, the input files may be any suitable data files compatible with a computing platform being used.

Non-FE model factors that contribute to turbine clearances are identified 430 and retrieved or created 432, such as, for example, blade growth, vane growth, bearing lift, and vibration. A respective contribution from each non-FE model factor is developed 434 in equation form for use in calculating clearances. Using FE model input files, and non-FE contributing factor input files, clearance synthesis dashboard 201 generates 436 clearance data and plots. In the exemplary embodiment, clearance data is generated in predetermined formats selected by the user. The input and output files are saved 438 to a computer readable medium selected by the user. From the generated data in the output files, a statistical module predicts 440 turbine clearances based on statistical variations of the contributing factors. Empirical clearance data is retrieved 442 from field data acquired from an operational machine, or test facility, and compared 444 to the predictions received in block 440. If the clearance predictions compare favorably to the field data, the clearance predictions are approved 446 and stored 448 on network drive 113 or other location accessible to users of clearance synthesis dashboard 201. If the clearance predictions do not compare favorably to the field data, the input data is checked 450 for a missing contributing factor. If a contributing factor is determined to be missing and the factor is part of a component that is modeled using FE, a new FE model is created and process 400 restarts at block 412. If the contributing factor determined missing is a non-FE contributing factor, the equation is re-developed and process 400 restarts at process block 430.

In operation, clearance synthesis dashboard 201 receives a plurality of data files including FE model input files 202 and non-FE contributing factor input files 206. Clearance synthesis dashboard 201 calculates turbine clearances versus time at locations selected by the user, and calculates turbine clearances versus location over a period of time selected by the user. After validation of results of the calculations, dashboard 201 generates data files, charts, and plots that represent the calculated results graphically and/or tabularly.

Figure 6:
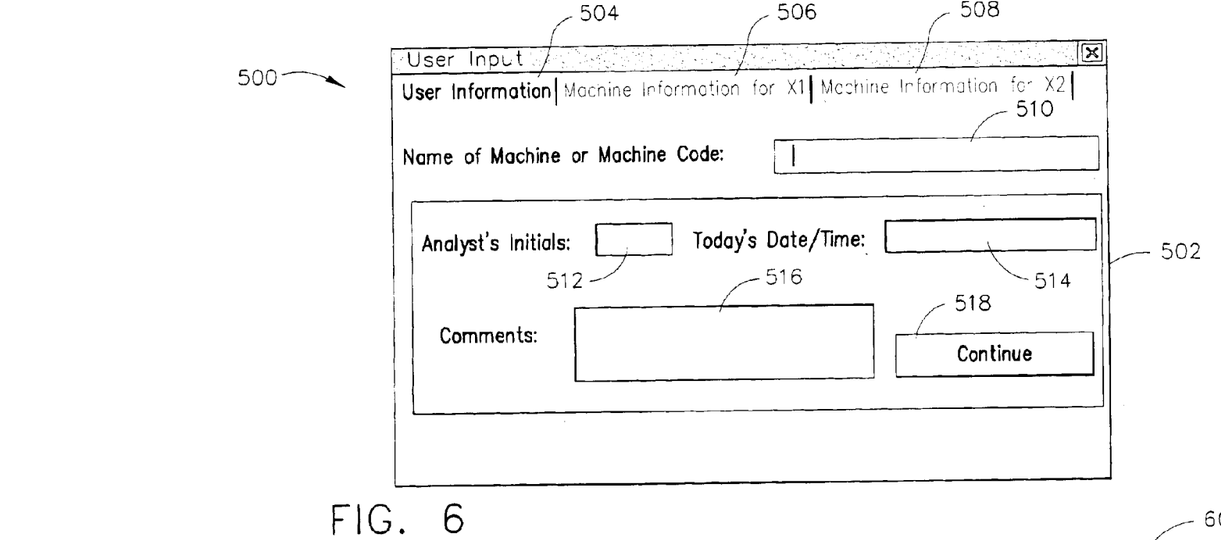
FIG. 6 is a screen shot of an exemplary user interface input screen that may be used with clearance synthesis dashboard shown in FIG. 3.

FIG. 6 is a screen shot of an exemplary user interface input screen 500 that may be used with clearance synthesis dashboard 201 shown in FIG. 3. In the exemplary embodiment, screen 500 is a typical Windows™ input window 502 including three tabs 504, 506, and 508 respectively. User information tab 504 prompts a user for administrative information to facilitate organizing databases and calculation results including, for example, a "Name of Machine or Machine Code" field 510, an "Analyst's Initials" field 512, a "Today's Date/Time" field 514, a "Comments" field 516, and a "Continue" button. Screen 502 is a first screen of user interaction and allows a user to input specific information that may be used in calculations and labeling of plots. For example, "Machine Information for X1" tab 506 prompts a user for information specific to a selected machine, such as, for example, "Radius offset" and "Tolerances". If a field is left blank or is filled in incorrectly, an error message may prompt a user to correctly complete input fields 510, 512, 514, and 516. After input fields 510, 512, 514, and 516 are complete, a user may select a radio button 518 to continue with data input. In the exemplary embodiment, a user may select a machine designated as "X1". In another embodiment, any number of machines may have tabs from which a user may select.

"Machine Information for X2" tab 508 prompts a user for information specific to a selected machine. In the exemplary embodiment, a user may select a machine designated as "X2". In the exemplary embodiment, tab 508 prompts the user for the same information as described above and includes user prompts for the user to input values for a specific machine that may be designated as X2, such as, for example, "Bearing Lift" and/or "Shell Arm Corrections". The user may be prompted to enter these values when an appropriate radio button (bearing lift or shell arm) is selected.

Figure 7:
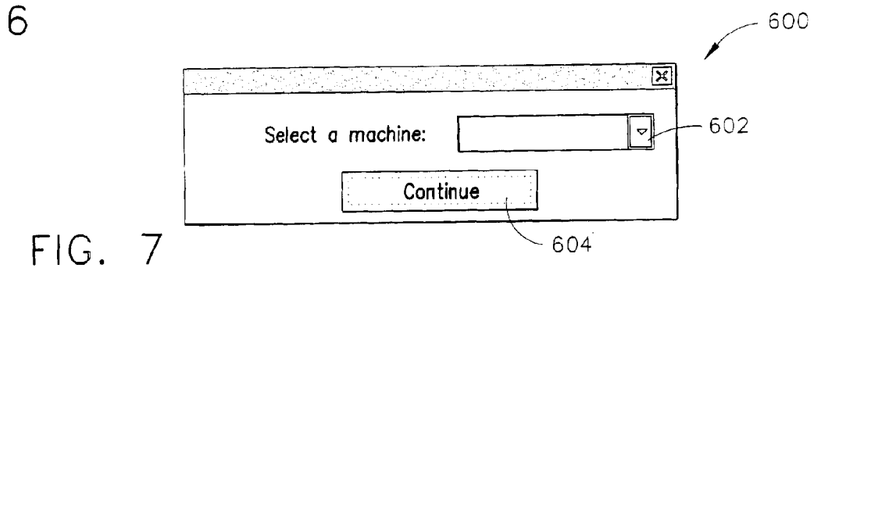
FIG. 7 is a screen shot of an exemplary "Select Machine" screen that may be used with clearance synthesis dashboard shown in FIG. 3.

FIG. 7 is a screen shot of an exemplary "Select Machine" screen 600 that may be used with clearance synthesis dashboard 201 shown in FIG. 3. Screen 600 prompts the user to choose from a plurality of different types of machines for which a calculation will be determined. A drop-down menu button 602 permits the user to select one of the plurality of machines for which calculations may be determined. After selecting the desired machine, the user clicks on the "Continue" button 604.

Figure 8:
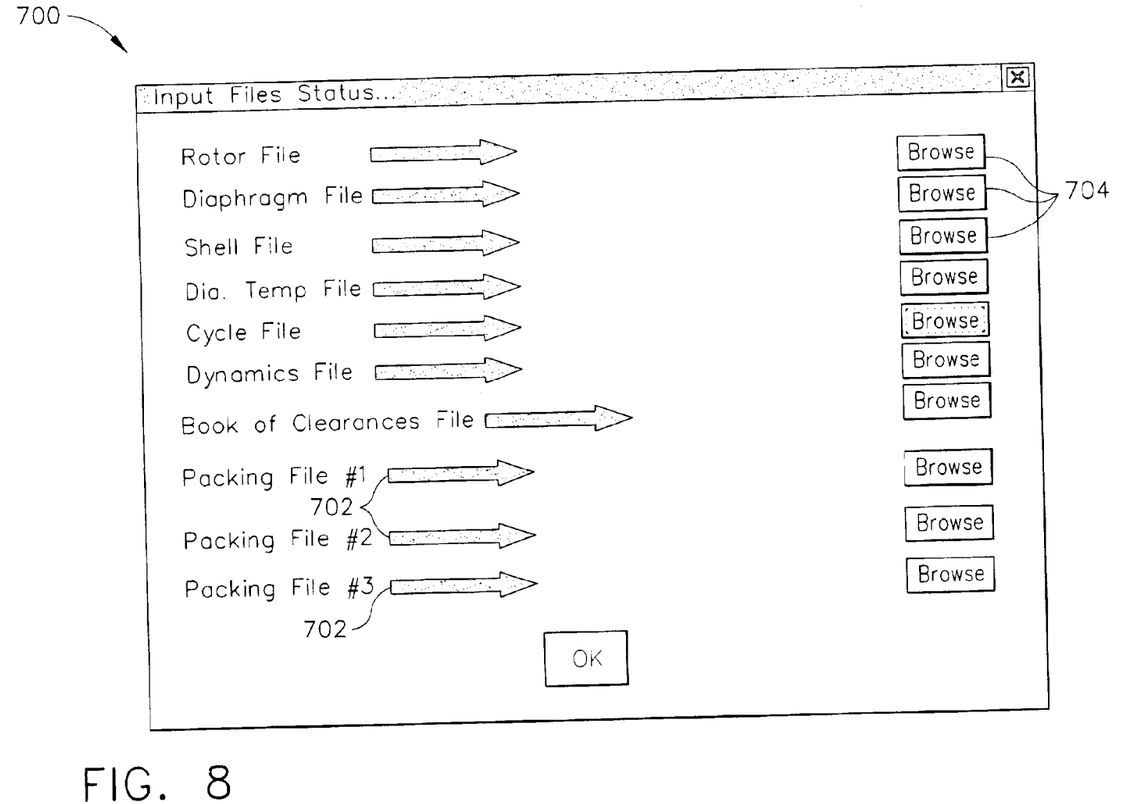
FIG. 8 is a screen shot of an exemplary "Input Status" screen that may be used with clearance synthesis dashboard shown in FIG. 3.

FIG. 8 is a screen shot of an exemplary "Input Status" screen 700 that may be used with clearance synthesis dashboard 201 shown in FIG. 3. Screen 700 indicates if dashboard 201 has identified the appropriate input files based on the information collected from "User Input" screen 502. If dashboard 201 has identified the file correctly, a filename will appear next to a corresponding indicator. In the exemplary embodiment, a plurality of arrows are used for the indicator. If the file is not identified, the text "FILE NOT FOUND" will appear next to corresponding indicator 702. The user may browse 704 to the appropriate file name on network drive 113 or other storage media accessible to the user and manually select the appropriate file.

Figure 9:
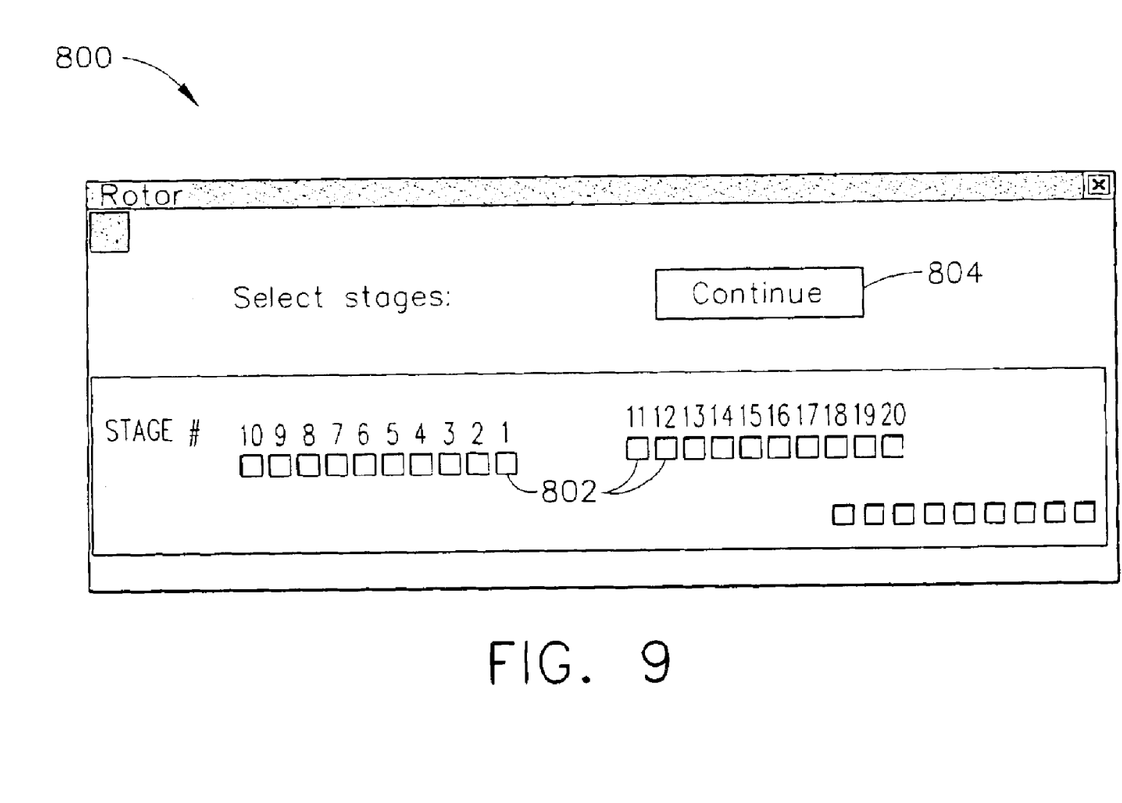
FIG. 9 is a screen shot of an exemplary "Select Stages" screen that may be used with clearance synthesis dashboard shown in FIG. 3.

FIG. 9 is a screen shot of an exemplary "Select Stages" screen 800 that may be used with clearance synthesis dashboard 201 shown in FIG. 3. "Select Stages" screen 800 prompts the user to select particular stages for which output is desired. The user selects a checkbox 802 corresponding to each desired stage(s), and a continue radio button 804 to continue. In the exemplary embodiment, some checkboxes may not be available for selecting because dashboard 201 automatically reads the diaphragm data file and allows only the checkboxes that correspond to stages found in the diaphragm file to be available. Unavailable stages may be grayed out to indicate an unavailable status.

Figure 10:
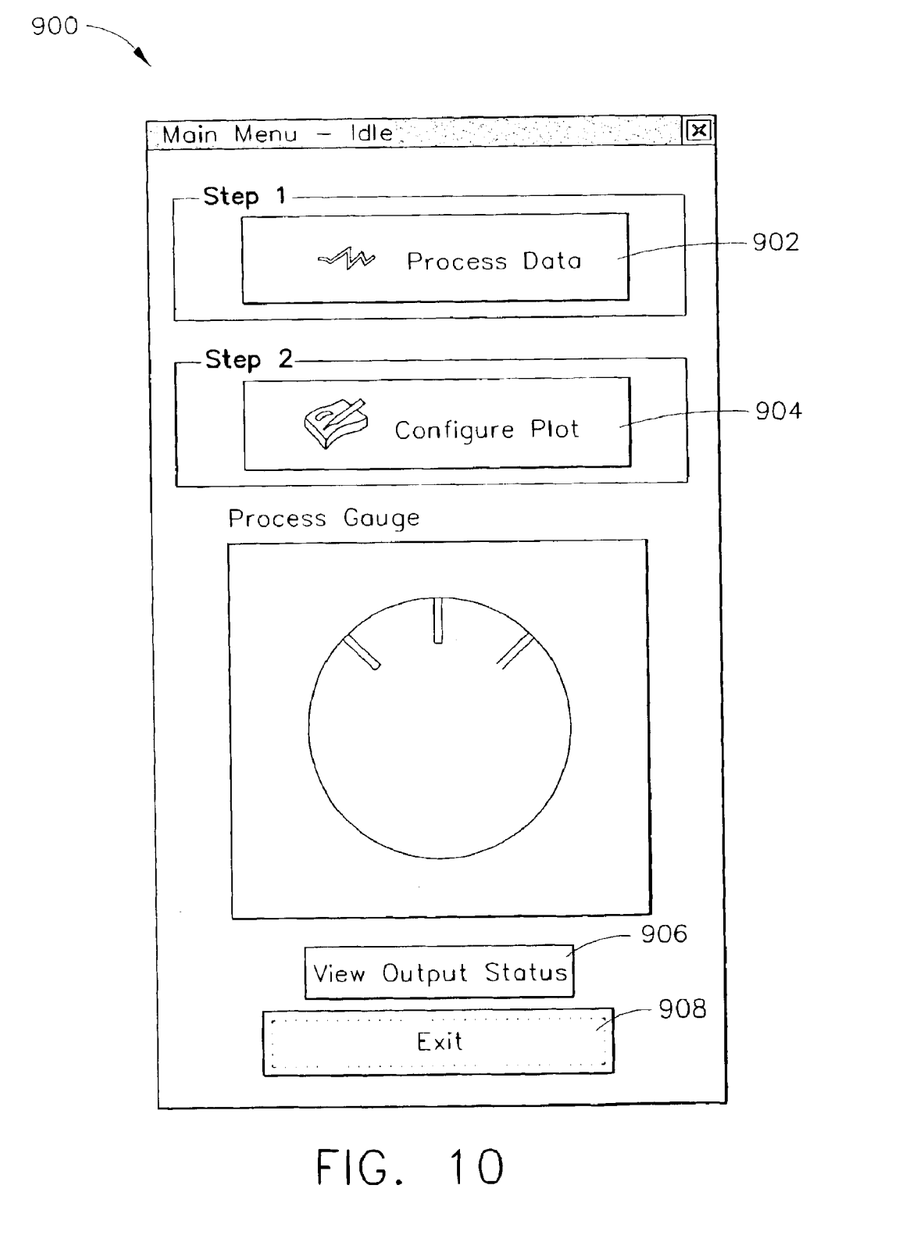
FIG. 10 is a screen shot of an exemplary "Main Menu" screen that may be used with clearance synthesis dashboard shown in FIG. 3.

FIG. 10 is a screen shot of an exemplary "Main Menu" screen 900 that may be used with clearance synthesis dashboard 201 shown in FIG. 3. In the exemplary embodiment, screen 900 includes four buttons: "Process Data" 902, "Configure Plots" 904, "View Output Status" 906, and "Exit" 908. "Process Data" 902 activates reading of data, performance of calculations, and formatting of data tables. "Configure Plots" 904 creates line and polar graphs presenting results of the calculations performed in "Process Data" 902. "View Output Status" 906 opens an "Output Status" screen where the user may view opened output files and/or save the files. "Exit" 908 will exit the user from dashboard 201. Upon exiting, dashboard 201 will close all input files.

Figure 11:
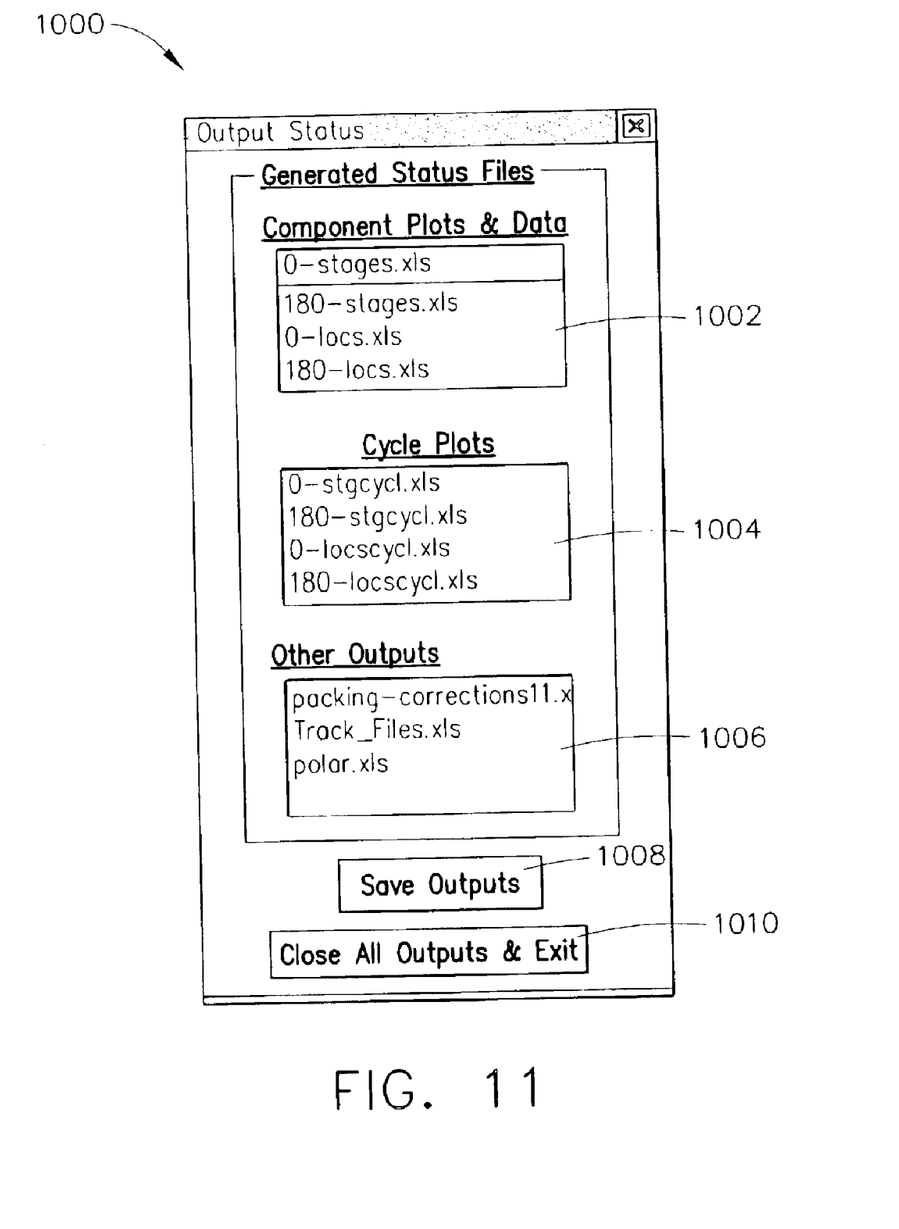
FIG. 11 is a screen shot of an exemplary "Output Status" screen that may be used with "View Output Status" shown in FIG. 9.

FIG. 11 is a screen shot of an exemplary "Output Status" screen 1000 that may be used with "View Output Status" 906 shown in FIG. 9. "Output Status" screen 1000 displays files that have been opened and written to. The files are divided into a plurality of types. In the exemplary embodiment, the files are divided into a component plot and data type 1002, a cycle plot type 1004, and an other output type 1006. At the bottom of the screen, a "Save outputs" button 1008 and a "Close all outputs and return" button 1010 are shown. In the exemplary embodiment, the user has the option of saving the output files to a spreadsheet by clicking on "Save outputs" button 1008, or the user may to close the output files and return to the main menu by clicking on "Close all outputs and exit" button 1010.

Figure 12:
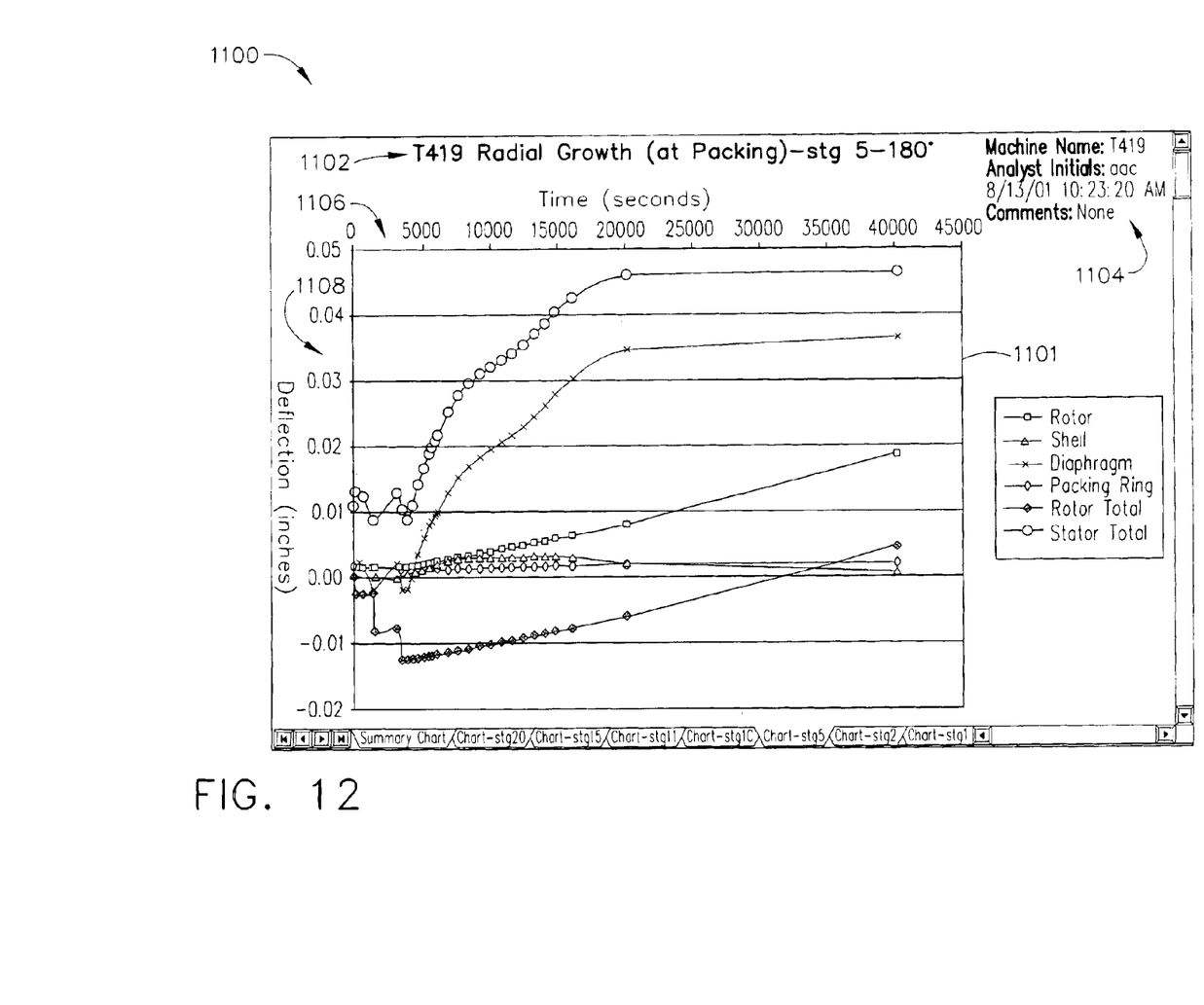

FIG. 12 is a screen shot of an exemplary display 1100 that may output from clearance synthesis dashboard 201 shown in FIG. 3. Display 1100 includes a graph 1101 of component deflection versus time that includes a heading 1102 that indicates, for example, a machine code, a graph type, and a location. A user information area 1104 includes data input by the user at tab 504. An x-axis 1106 indicates a time elapsed starting at a time zero or event initiation and ending at a time selected by the user or calculated by clearance synthesis dashboard 201 based on data input by the user. A Y-axis 1108 indicates a deflection in a unit selected by the user for components of turbine 10 selected by the user to be analyzed. A total deflection for each of the rotor and the stator is also included in graph 1101.

Figure 13:
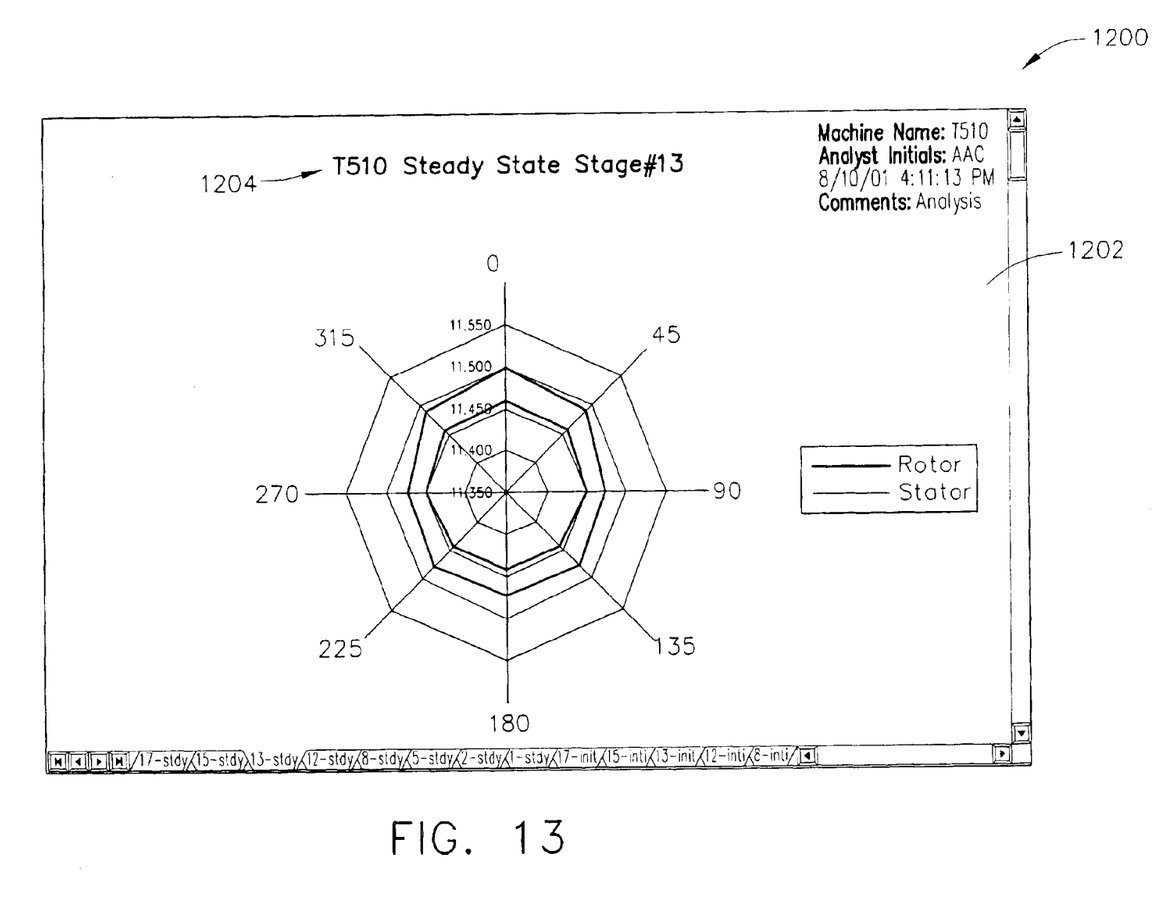
FIG. 13 is a screen shot of an exemplary display that may output from clearance synthesis dashboard shown in FIG. 3.

FIG. 13 is a screen shot of an exemplary display 1200 that may output from clearance synthesis dashboard 201 shown in FIG. 3. Display 1200 includes a polar type graph 1202 that includes a heading 1204 that indicates, for example, a machine name, an operational cycle state, and a location of the analysis. Graph 1202 includes a polar scale that indicates an amount of deflection that takes place at a plurality of locations angularly displaced about a longitudinal axis of turbine 10.

The above-described clearance synthesis dashboard is cost effective and highly reliable. The clearance synthesis dashboard includes a plurality of formatted input files and a calculation engine that determines turbine radial clearance changes that occur in a steam turbine for various operating cycles. The results are output in a format selected by the user. The output results facilitate visualizing changes occurring in a turbine. As a result, the clearance synthesis dashboard facilitates the design and maintenance of rotating machinery in a cost effective and reliable manner.

Exemplary embodiments of the clearance synthesis dashboard are described above in detail. The configurations are not limited to the specific embodiments described herein, but rather, components of the configuration may be utilized independently and separately from other components described herein. Each clearance synthesis dashboard component can also be used in combination with other clearance synthesis dashboard components.

While the invention has been described in terms of various specific embodiments, those skilled in the art will recognize that the invention can be practiced with modification within the spirit and scope of the claims.

What is claimed is:

1. A method of determining radial clearances in a rotating machine including at least one shell, at least one rotor, and at least one stationary component, said method comprising:

creating a three-dimensional finite element model for at least one of a shell, a packing structure, a diaphragm, and a rotor within the rotating machine;

creating a cycle deck data file for the rotating machine;

determining an initial clearance versus time; and determining an initial clearance versus location.

2. A method in accordance with claim 1 wherein creating a finite element model comprises creating a two-dimensional axi-symetric finite element model of at least one rotor.

3. A method in accordance with claim 1 wherein creating a finite element model further comprises creating a formatted spreadsheet input file including calculated values for a component deflection versus a time for each component modeled, and a component deflection versus a location for each component modeled.

4. A method in accordance with claim 1 wherein said method further comprises creating a data file for at least one of a machine system layout, one-dimensional computation, cold clearance, rotor vibration, and bearing lift.

5. A method in accordance with claim 4 wherein creating a data file for a machine system layout comprises determining axial positioning and coordinates.

6. A method in accordance with claim 4 wherein creating a data file for a one-dimensional computation comprises determining design lengths for at least one of rotor blades, packing teeth, and tip spill.

7. A method in accordance with claim 4 wherein creating a data file for a one-dimensional computation further comprises determining a set of material properties for at least one of rotor blades, packing teeth, and tip spill.

8. A method in accordance with claim 4 wherein creating a data file for a cold clearances comprises determining an initial clearance for machine components versus a location for each clearance determined.

9. A method in accordance with claim 4 wherein creating a data file for a rotor vibration comprises determining at least one of a rotor resonance condition, a rotor vibration velocity amplitude at a plurality of predetermined rotational speeds, a rotor vibration displacement amplitude at a plurality of predetermined rotational speeds, and a rotor deflection versus location at a steady state operating condition of the machine.

10. A method in accordance with claim 4 wherein creating a data file for a bearing lift comprises determining a rotor deflection versus a location due to bearing lift at steady state operating condition of the machine.

11. A method in accordance with claim 1 wherein determining a transient clearance versus time and an transient clearance versus location comprises determining a deformed stator coordinate solution versus time and determining a deformed stator coordinate solution versus location.

12. A method in accordance with claim 1 wherein determining a transient clearance versus time and an transient clearance versus location comprises determining a deformed rotor coordinate solution versus time and determining a deformed rotor coordinate solution versus location.

13. A method in accordance with claim 1 wherein determining a transient clearance versus time comprises determining a difference between an initial clearance versus time and a sum of a stator deformed clearance versus time and a rotor deformed clearance versus time.

14. A method in accordance with claim 1 wherein determining a transient clearance versus location comprises determining a difference between an initial clearance versus location and a sum of a stator deformed clearance versus location and a rotor deformed clearance versus location.

15. A computer program embodied on a computer readable medium for determining a rotating machine radial clearance, said program comprising a code segment that:

prompts a user to input at least one of a machine identifier, a user identifier, a current date and time, and a comment;

retrieves stored data for the machine identified;

prompts a user to input data from a selection of data exclusive to the machine identified;

provides a user with an input file status for the machine identified; and provides a graphical output of calculations based on data input by the user and data retrieved from storage.

16. A computer program in accordance with claim 15 further comprising a code segment that:

generates at least one of a radial plot of calculated deflection at a predetermined time for a predetermined location, and a plot of deflection versus time for a predetermined location; and displays each said plot as requested by the user.

17. A network based system for determining a rotating machine radial clearance, said system comprising:

a client system comprising a browser;

a centralized database for storing machine information; and a server system configured to be coupled to said client system and said database, said server system further configured to:

receive machine information from said client system;

store finite element model information in said centralized database;

track machine information;

update said centralized database periodically with newly received machine information to maintain machine information; and provide machine information in response to an inquiry.

18. A system in accordance with claim 17 wherein said server system is further configured to:

determine a rotating machine radial clearance; and generate at least one of a radial plot of calculated deflection at a predetermined time for a predetermined location, and a plot of deflection versus time for a predetermined location.

* * * * *